United States Patent [19]

Nanda et al.

[11] Patent Number: 4,548,673
[45] Date of Patent: Oct. 22, 1985

[54] METHOD AND APPARATUS FOR DEINKING

[75] Inventors: Ashok K. Nanda, Sale, England; Luigi Silveri; Michael A. McCool, both of Lenox, Mass.

[73] Assignee: Beloit Corporation, Beloit, Wis.

[21] Appl. No.: 600,923

[22] Filed: Apr. 16, 1984

[30] Foreign Application Priority Data

Apr. 19, 1983 [GB] United Kingdom ............... 8310494

[51] Int. Cl.⁴ ............................................. D21B 1/32
[52] U.S. Cl. ............................................. 162/4; 162/5; 162/55; 209/165; 209/167; 209/170; 210/221.1; 210/221.2
[58] Field of Search ............... 162/4, 5, 55; 209/164, 209/165, 188, 167, 170; 210/221.1, 221.2

[56] References Cited

U.S. PATENT DOCUMENTS

| | | | |
|---|---|---|---|
| 4,214,982 | 7/1980 | Pfalzer | 209/164 |
| 4,331,534 | 5/1982 | Barnscheit | 162/4 |
| 4,399,028 | 8/1983 | Kile et al. | 209/164 |

Primary Examiner—William F. Smith
Attorney, Agent, or Firm—Dirk J. Veneman; Raymond W. Campbell; Gerald A. Mathews

[57] ABSTRACT

A method and apparatus for deinking a fibre stock or slurry. In order to optimize the separation process the invention proposes to independently control the air injection phase, the mixing phase, and the separation phase by splitting them into separate steps.

Thus, there is provided a separation cell which is fed with slurry from an inlet. Air is introduced into the slurry before entry into the separation cell and before entering a mixing section which mixes the air and slurry before entering the separation cell. The air is introduced under pressure by way of a porous sintered sleeve, while the mixing is achieved by the provision of three turbulence discs in the preferred embodiment. Alternative turbulent generating means may be employed.

The mixing ensures contact of the ink with the air bubbles which separate out in the separation cell and rise to the surface as a foam. The foam is removed by suction, while the deinked fibre slurry is drawn off from the tank by means of a weir or stand pipe. A separation plate isolates the foam from the draw off section of the tank. It is preferred that the separation cell is divided into a plurality of cells which are fed from a respective inlet, each having a respective said air inlet and mixing section.

15 Claims, 4 Drawing Figures

METHOD AND APPARATUS FOR DEINKING

DESCRIPTION

The present invention relates to a method of deinking stock and to an apparatus incorporating the method. The method and apparatus has particular application in paper making.

Deinking has traditionally been done either by washing or by flotation. Both these systems have their limitations. Washing often results in low yield and incomplete ink removal which results in low brightness. Flotation is a sensitive process which can be de-stablized by variations in the incoming raw materials, ink types etc. and the runability of flotation-deinked stock on the paper machine is lower than for wash-deinked stock. Moreover the flotation cells themselves can have considerable losses. The problem arises because flotation consists of several unit processes which are fairly independent. However, in most cases the entire flotation process is carried out in a single step in a single piece of equipment—the flotation cell. This does not allow individual control of the parameters and results in less than optimum performance.

Furthermore, the known processes have not resolved the problem of how to remove stickies or hot melts when using recycled waste.

The aim of the present invention is to overcome the problems described above.

According to one aspect of the invention there is provided a method of deinking a fibre stock or slurry comprising the steps of independently introducing air into the slurry, mixing the air bubbles and slurry, and separating the ink-laden air bubbles from the fibre slurry, where each of these processes is controlled independently.

The three steps are carried out separately in three pieces of interconnected equipment. Thus, each can be adjusted, optimized or modified independently of the others. In the air injection phase the quantity of air and size of air bubbles are controlled. In the mixing phase the probability of contact between air bubble and ink particle is increased by subjecting the slurry to intensive turbulent mixing and the degree of turbulence is controlled in this phase. In the air separation phase, the air bubbles, each carrying as much ink as posible, come to the surface after a retention time determined by the cell height, where they form a foam which is removed. Foam generated with small diameter bubbles has been found to be more stable than that formed by large bubbles and does not collapse during the removal process.

Loss of solids is kept to the minimum by carrying out the separation in a controlled flow pattern.

According to another aspect of the invention there is provided apparatus for deinking a fibre stock or slurry comprising one or more slurry inlet manifolds feeding slurry by way of a respective mixing section to a separation cell, each mixing section having disposed upstream thereof one or more air inlet devices and having in the mixing section at least one turbulent flow generating means for mixing the air bubbles and slurry, the separation cell having a suction line for removing foam from the surface of the slurry and an outlet draw off for the clean slurry.

The air inlet devices may comprise a plurality of venturi nozzles or more preferably a porous medium such as a mesh or porous sintered sleeve. Air is applied under pressure to the porous medium and thereby enters the slurry in the form of bubbles. The air pressure and pore size may be varied to adjust the quantity of air introduced and the size of the bubbles.

The turbulent flow generating means may comprise serrated tubes, static mixers or agitators in pressurized vessels or more preferably orifice plates (turbulence discs). In the preferred embodiment three turbulence discs are disposed serially spaced apart with interposed turbulence chambers.

The separation cell preferably comprises a tank with the inlet from the mixing sections entering at the bottom, a vacuum connection for drawing off the foam, an outlet for the slurry formed by a stand pipe or weir of adjustable height with top opening, and a separation plate extending into the liquid and dividing the tank to isolate foam from the slurry outlet.

The present invention will now be further described hereinafter, by way of example only, with reference to the accompaying drawings, in which.

Figure 1:
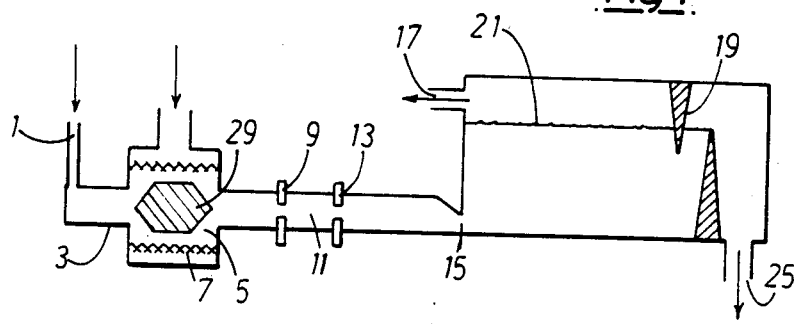
FIG. 1 is a schematic drawing showing the principle components of the apparatus according to the invention.

Referring to the drawings there is shown apparatus for deinking a fibre slurry. The method of deinking according to the present invention has three phases. Air injection, where air is introduced into the fibre slurry which is to be deinked; mixing, where the fibre slurry is intimately mixed with the air so that the ink particles are picked up by the air bubbles; separation, where a resulting ink-rich foam is removed from a clean slurry.

Referring firstly to FIG. 1. The inky slurry flows along pipe 1 and enters tangentially a pipe 3 and flows through a chamber 5 accommodating a sleeve 7. A solid cylindrical insert 29 is placed inside the sleeve. The size of the gap between insert and sleeve is controlled. It has been found that there is an optimum range of gap size for bubble size control and air bubble distribution. The purpose of adjusting the size of the gap is to control the velocity of the liquid moving past the sleeve 7 so as to optimise the bubble formation in the stream. This velocity is preferably in the range between 10 and 25 feet per second (3.05 and 7.62 meters per second). More preferably, the optimum velocity range is between 17 and 20 feet per second (5.19 and 6.10 meters per second). The sleeve 7 is preferably made of a porous material such as mesh or more preferably a sintered porous material. Air pressure is applied to the sleeve and this emerges into the slurry in the form of air bubbles. The slurry and air then pass through a turbulence disc 9 and into a turbulence chamber 11 where the slurry and air bubbles are intimately mixed.

Figure 2:
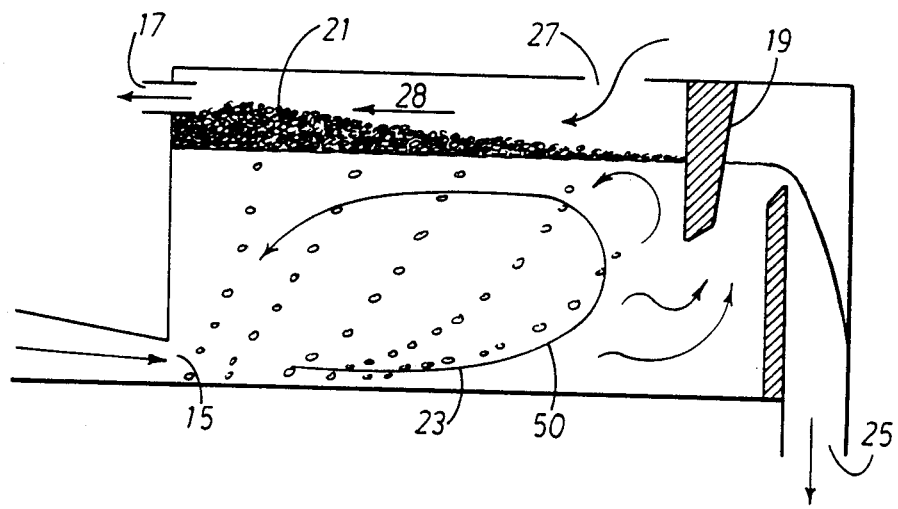
FIG. 2 illustrates diagrammatically the flow pattern in the separation cell.

Further turbulence discs 13 may be disposed in series where further mixing is required. The mixture is passed by way of an inlet nozzle 15 which is designed to give a specific inlet velocity to ensure correct cell flow pattern into a separation cell where the air bubbles with ink attached rise to the surface as a foam 21 to be removed by way of a vacuum draw off 17. A baffle 19 separates the foam 21 from a draw off 25 for the clean slurry. The flow pattern in the separation cell is shown in FIG. 2. The liquid follows a generally elliptical path 23 whilst the air bubbles rise to the surface following straight or parabolic paths. The trajectory is determined by the resultant of the buoyancy force and liquid velocity. The velocity of entry of the slurry into the cell is adjusted so that the bubble trajectory is limited, and does not extend past the baffle 19. This avoids contamination of the otherwise deinked slurry which flows off at 25. An opening 27 is provided in the cell roof to allow air to enter the cell and create a draught 28 of controlled velocity across the surface of slurry to thereby direct the foam toward the vacuum draw off.

Figure 3:
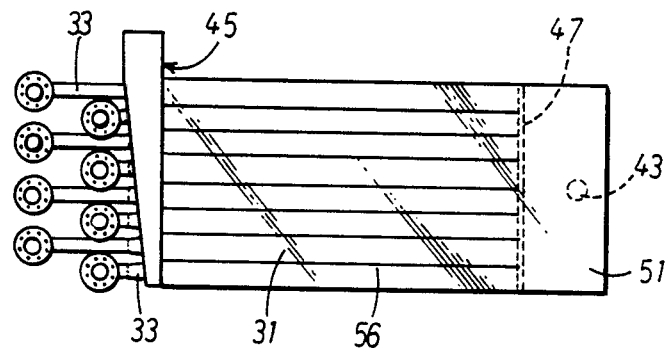
FIG. 3 is a plan view on III—III of FIG. 4 showing one embodiment of apparatus according to the invention.
Figure 4:
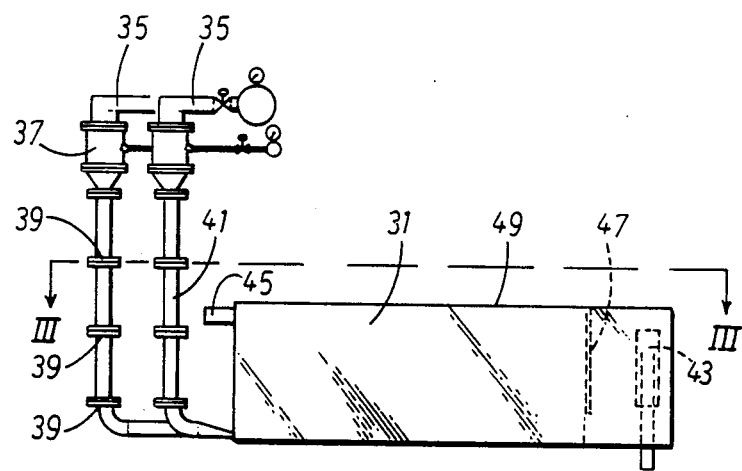
FIG. 4 is a side view of the apparatus of FIG. 3.

In the embodiment of the apparatus illustrated in FIGS. 3 and 4 the separation cell 31 is fed with slurry from a plurality of inlet nozzles 33. The number depends on the flow to be handled. In the illustrated embodiment eight stock feed inlets 35 are provided and each has an air injection chamber 37 and three turbulence discs 39 and associated turbulence chambers 41 defining a mixing section. The slurry and air passes downwardly through the mixing section. To achieve the desired mixing of the air and slurry the number of turbulence discs may be reduced or increased. The air injection chamber comprises a sintered sleeve through which air is forced under pressure. By changing the porosity of the sleeve and/or the air pressure, and/or the gap between the insert 29 and the sleeve 7 the quantity of air introduced and the size of the bubbles created can be adjusted.

The separation cell 31 comprises a closed tank in which the level of liquid therein is controlled by a stand pipe 43 whose height is adjustable. The clean fibre slurry flows off by way of the stand pipe 43. There is circulation of the slurry mixture on entry into the cell whilst the air bubbles with the attached ink particles rise to the surface as a foam. The flow pattern within the cell is such that the slurry describes an elliptical path 50, as shown, whilst the air bubbles follow straight or parabolic paths upward to the surface.

This pattern gives rise to a liquid velocity beneath the foam layer which prevents fibre, fines and ash from being lost in the foam. This accounts for the extremely low losses from this unit. The foam is sucked off the surface of the slurry by way of a vacuum manifold 45. Where the flotation cell is divided into cells by divider plates shown at 56, the manifold 45 (as illustrated) preferably increases in width from the front to the back of the cell to accommodate the additional volume of froth as it is picked up from successive cells. A baffle 47 is fixed to a cover 49 of the tank and projects into the slurry to isolate the foam from the accepted stock chamber 51 containing the slurry outlet 43.

The position and depth of this baffle are important. The position of the baffle from the inlet is tied to the flow pattern, hence inlet velocity. The baffle is placed after all the air has separated and before any reversal in flow pattern 50 occurs, (i.e. from FIG. 2: flow pattern 50 circulates counterclockwise and would induce an undersized clockwise circulation downstream if the baffle did not terminate the cell).

The depth of the baffle must be sufficient to prevent air-rich slurry escaping into the accepts, but not so deep as to restrict the flow. Depths of 55% to 75% of cell depth have been found useful.

As an alternative to the stand pipe 43 an adjustable height weir may be provided similar to the weir shown in FIGS. 1 and 2.

The present method and apparatus removes not only inks but also stickies, hot melts and other similar substances. By separating the method into the three phases, each phase can be adjusted or modified to give the optimum results. It has been found that the machine can remove up to 90% of inks, and give a yield per pass of about 98.5% to 99%.

The method and apparatus may constitute the main or only component of a stock treatment system or may be integrated, along with other unit processes and equipment, into various stock treatment processes according to application, such as: (I) On the main stock line for ink and stickies removal; (II) On the underflow from washers for ink removal; (III) On the rejects from cleaners, screens etc for stickies removal; (IV) In paper machine stock approach flow or (V) on paper machine black water and white water. The apparatus may find application also in wood-based pulp mills (e.g. remove pitch and resin) nonwood pulp mills (e.g. remove pith from bagasse) or in the mining industry or in any separation process based on flotation.

In the air injection phase the quantity of air and size of air bubbles are controlled with the object of ensuring that ink particles and air bubbles come into contact. The aim is to produce bubbles of less than 1 mm diameter. This is determined by pore size in a sintered sleeve and by nozzle diameter and fluid velocity for a venturi injector.

In the mixing phase the probability of contact between air bubble and ink particle is increased by subjecting the slurry to intensive turbulent mixing. Hydraulic turbulence or mechanical agitation could be used. The degree of air/ink contact is determined by the amount of small scale turbulence generated. This is dependent on the geometry of the turbulence discs and the number of passes through turbulence discs.

In the separation phase the air bubbles are allowed to come to the surface. Complete removal of air is determined by the retention time and, therefore, by the length and the height of the cell, since width will usually be fixed by capacity considerations. Controlled 2-dimensional flow pattern within the separation cell gives rise to a higher yield. Lengthwise divider plates 56 may be installed to ensure 2-dimensional flow. In the case of hydraulically generated cell turbulence, the entrance velocity represents the energy which goes into generating the turbulence. For optimum channel flow conditions the entrance velocity head is about 10–20% higher than the height of fluid above the entrance. For maximum yield it is desirable to have two-dimensional flow. Thus, the inlet nozzles 15 are wide and thin. Values of 2–2.5 liters per minute per millimeter width have been found suitable.

We claim:

1. A method of deinking a fibre stock or slurry comprising the steps of independently controlling the flow of slurry and air to a mixing zone; introducing the air into the slurry while controlling the quantity and size of air bubbles introduced; passing the slurry with air bubbles introduced therein to a mixing zone; mixing the air and the slurry with said mixing being controlled independently and apart from said step of introducing the air to bring the air bubbles into contact with the ink; passing the mixed air and slurry from the mixing zone to a separation cell at a controlled flow rate, and separating the ink-laden air bubbles from the fibre slurry, wherein each of the steps is controlled independently.

2. A method according to claim 1 wherein an air inlet device is provided to introduce the air into the slurry, and the quantity and size of the air bubbles are controlled by varying at least one of the air pressure and an orifice size of the air inlet device.

3. A method according to claim 2 wherein the air is introduced as bubbles which are less than 1 mm in diameter.

4. A method according to claim 1 wherein the air bubbles and slurry are subjected to turbulent mixing during the mixing step.

5. A method according to claim 4 wherein the turbulence is generated hydraulically.

6. A method according to claim 1 wherein after the mixing step the ink-laden bubbles are passed into a separation cell where they rise to the surface of the cell in the form of an ink-laden foam which is removed from the surface.

7. A method according to claim 6 wherein suction is employed to remove the foam.

8. Apparatus for deinking a fibre stock or slurry comprising a separation cell, means for introducing air into the slurry, and a mixing section disposed downstream of said means for introducing air and upstream of said separation cell; said means for introducing air comprising an air inlet device disposed in a slurry inlet upstream of said mixing section, said mixing section comprising at least one turbulent flow generating means for creating a mixture to be fed to the separation cell where an ink-laden foam is formed on the surface of the slurry as a result of separation; and said separation cell being a tank having an inlet toward the bottom for feeding the mixture from said mixing section to the cell, one of a standpipe and weir of adjustable height for determining the surface level of the slurry in the tank, means for removing the ink-laden foam from the surface of the slurry, an outlet draw off for the clean slurry and a separation plate extending into the slurry and partially dividing the tank to isolate said means for removing foam from said clean slurry outlet.

9. Apparatus according to claim 8 wherein a suction manifold comprises the means for removing the foam.

10. Apparatus according to claim 8 wherein a porous medium comprises the air inlet device.

11. Apparatus according to claim 10 wherein a sleeve of porous sintered material comprises the porous medium.

12. Apparatus according to claim 11 wherein a solid cylindrical insert is disposed within the sintered sleeve to define a gap therebetween through which the slurry passes.

13. Apparatus according to claim 8 wherein at least one turbulence disc constitutes the turbulent flow generating means.

14. Apparatus according to claim 13 wherein three turbulence discs are provided, the discs are serially spaced apart and a respective turbulence chamber is disposed downstream of each disc.

15. Apparatus according to claim 8 wherein the separation cell is divided into a plurality of chambers, with each chamber being fed from a respective inlet which has a said air inlet device and a said mixing section.

* * * * *